United States Patent [19]

Luger

[11] 3,777,234
[45] Dec. 4, 1973

[54] CIRCUIT ARRANGEMENT FOR REGULATING THE SPEED OF A DC MOTOR

[75] Inventor: August Luger, Munich, Germany

[73] Assignee: Agfa-Gevaert Aktiengesellschaft, Leverkusen, Germany

[22] Filed: Sept. 13, 1971

[21] Appl. No.: 180,008

Related U.S. Application Data

[63] Continuation of Ser. No. 889,632, Dec. 31, 1969, abandoned.

[52] U.S. Cl. .................................. 318/326, 318/334
[51] Int. Cl. .............................................. H02p 5/16
[58] Field of Search.................... 318/326, 327, 328, 318/334

[56] References Cited
UNITED STATES PATENTS

| 3,689,816 | 9/1972 | Matthew | 318/327 |
| 3,514,686 | 5/1970 | Shano | 318/327 |
| 3,381,199 | 4/1968 | Persson | 318/327 |
| 3,335,350 | 8/1967 | Persson | 318/327 |

Primary Examiner—Bernard A. Gilheany
Assistant Examiner—Thomas Langer
Attorney—Arthur O. Klein

[57] ABSTRACT

A circuit arrangement for controlling the speed of a DC motor by comparing a first voltage, which varies with the speed of the motor, with a second, control voltage, and varying the current fed to the motor in accordance with the resultant of the two voltages. A bridge circuit including a first current amplifier supplies a constant control voltage (the second voltage); the control voltage is compared with the first voltage by a differential amplifier. The resultant voltage is fed to a second current amplifier the output of which controls current input to the motor. The first voltage is preferably supplied by a generator driven in synchronism with the motor, and the second voltage is preferably supplied by a bridge having a semiconductor in one branch thereof. The circuit includes temperature-dependent resistances which compensate for temperature variations in the generator, as well as in the circuit arrangement generally.

11 Claims, 1 Drawing Figure

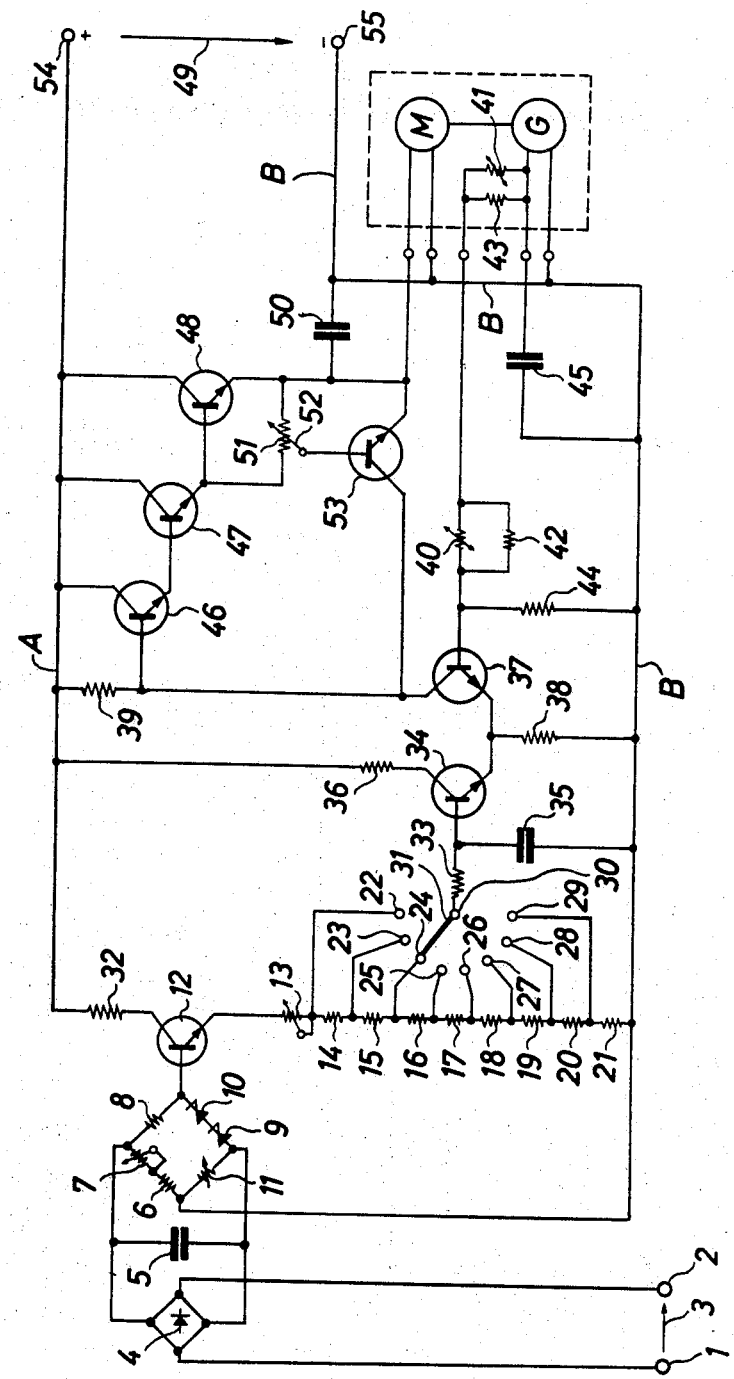

CIRCUIT ARRANGEMENT FOR REGULATING THE SPEED OF A DC MOTOR

This is a continuation, of application, Ser. No. 889,632 filed Dec. 31, 1969, now abandoned.

This invention relates to a circuit arrangement for adjusting the speed of rotation of a direct current motor, and more particularly to a circuit arrangement for maintaining the motor speed at a predetermined desired value. The circuit arrangement of the invention utilizes a control voltage which is compared to a control voltage dependent on the speed of the DC motor. Direct current motors provided with speed controlling means in accordance with the invention may be used, for example, in microfilm development apparatus, photocopy machines and installations having dosing or injecting pumps, in which the maintenance of a constant speed of rotation of the motor is very important.

A known circuit arrangement for controlling the speed of a DC motor employs a control voltage, which is produced by a known circuit arrangement including a zener diode and a voltage divider. The output of the voltage divider is applied to a first end of a resistance the second end of which is connected to the input of an amplifier. A further voltage is superimposed on the control voltage at the second end of the resistance which is in series with said control voltage, said further voltage being opposite to the control voltage. This further voltage is produced by a generator which is connected to the shaft of the motor. The voltage composed of the aforementioned two voltages is imposed on said amplifier stage, by means of which output transistors forming part of the motor circuit are adjusted or controlled. This known type of circuit arrangement has the disadvantage that, when the operation voltage of the motor supply varies, as well as when temperature changes occur, the rotational speed of the motor does not remain constant.

In accordance with the circuit arrangement of this invention, it is possible, however, to obtain with a predetermined control voltage, a constant motor speed which is independent of variations of the motor power supply voltage and of temperature changes in the circuit arrangement and in the generator. Furthermore, the circuit arrangement of this invention is less sensitive to load changes than are previously known circuit arrangements.

The objects of the invention can be achieved with relatively simple circuit control means. A preferred circuit arrangement in accordance with the invention includes a bridge circuit which is energized by a direct current supply voltage, one branch of the bridge having at least one semi-conductor element which supplies a substantially constant voltage; in a further bridge branch there is provided an adjustable resistance. The bridge output is connected to a current amplifier stage at the output of which an adjustable control voltage is taken off. The current amplifier stage is connected to a differential amplifier which serves as a comparator between the control voltage and the voltage applied from the motor-driven generator. The output of the differential amplifier is connected with a further current amplifier stage by means of which the motor current of the DC motor is maintained constant so that the predetermined speed of rotation of the motor can be adjusted in accordance with the control voltage. That part of the input circuit of the differential amplifier which is mounted in the generator has at least two temperature-dependent resistances which have a definite relationship with regard to the temperature, such resistances serving to compensate for temperature variations within the generator as well as in the circuit arrangement generally.

Preferably the semi-conductor element employed in the control voltage supplying bridge is at least one zener diode, and the resistance located on the adjacent bridge branch is adjustable in such a way that the voltage changes which manifest themselves in the zener diode are compensated by the resistance at the bridge output.

Since the zener diodes have finite internal resistances, a constant control voltage cannot be produced when the supply voltage varies. Furthermore, the input resistance of the current amplifier which is connected to the output of the bridge circuit is so large that the current flowing through it is negligibly small in comparison to the current flowing to the bridge branches. The current variations which occur in the zener diode can thus be compensated at the bridge output by means of an adjustable compensating resistance in the adjacent bridge branch.

In order for the input resistance of the current amplifier, which is fed by the bridge output, to be high, the current amplifier has at least one transistor connected in emitter-follower relationship; the output circuit of the bridge has at least one adjustable resistance interposed therein. By means of this adjustable resistance, the control voltage can be adjusted in accordance with the selected speed of the DC motor. The emitter-follower, which is connected to act as a current amplifier, also functions as an impedance converter. Current variations which occur in the emitter circuit are hardly noticeable at the input, that is, there is little feedback.

In accordance with the disclosed embodiment of the invention, there is present in the emitter circuit of the current amplifier a multi-stage voltage divider by means of which a desired voltage may be selected by means of a multi-position switch. The illustrative differential amplifier has two transistors, the emitters of which are connected to a common resistance. The collector resistance of the first transistor is low-ohmic and the collector resistance of the second transistor is high-ohmic. The first transistor is controlled by the control voltage and the second transistor is controlled by the generator voltage. The first transistor of the differential amplifier also acts as an impedance-converter in order to put still less of a load on the bridge circuit. Since the collector resistance of the second transistor is high-ohmic, the current flowing through the second transistor does not substantially affect the control voltage drop at the common emitter resistance. Due to this, a voltage increase or a voltage decrease caused by this current at the emitter resistance is negligibly small, so that the voltage at the emitter resistance can be assumed, with an adjusted control voltage, to be almost constant.

The additional current amplifier preferably includes transistors connected in cascade. By means of this further current amplifier, the high-ohmic output resistance of the differential amplifier is adjusted to an optimum degree to that of the small resistance of the DC motor, so that the small currents of the output circuit of the differential amplifier can be amplified in a sufficient manner for the direct current motor.

In order to avoid damage to or destruction of the DC motor when it is stalled, there is provided a current-limiting means in the circuit which connects the differential amplifier with the additional current amplifier. By means of this limiting arrangement the additional current amplifier can be controlled.

According to a preferred embodiment of the invention, the current-limiting arrangement has a transistor, the collector of which is connected to the base of the input transistor of the additional current amplifier, the emitter of which is connected to the emitter of the output transistor of the additional current amplifier in the base of which is connected through a potentiometer with the base and emitter of the output transistor which are connected by the total resistance of the potentiometer.

In order to compensate for temperature variations in the generator as well as in the circuit generally, there is provided, in the region of the differential amplifier, a temperature-dependent resistance in the base branch of the transistor which is connected with the generator, and in series with this resistance in the region of the generator there is provided a further temperature-dependent resistance. The temperature-dependent resistances have the characteristic of decreasing their resistances as temperature increases.

Advantageously there may be used, as temperature-dependent resistances, resistances of the NTC types. It is furthermore possible to provide an ohmic resistance in parallel with the temperature-dependent resistances at all times.

The invention is illustrated in conjunction with a single FIGURE which is a circuit diagram of a preferred embodiment of the invention.

In the drawing there is illustrated a DC motor which is designated by the letter M and a generator which is designated with the letter G. An alternating current supply voltage 3 which is connected to terminals 1 and 2 is rectified by means of a rectifier arrangement 4 which is provided with a current-smoothing condenser 5. A bridge circuit is arranged parallel to the condenser 5; in the upper two branches of the bridge circuit there are resistances 6,7 and 8 arranged as shown. In a further, lower branch of the bridge there are disposed two series connected zener diodes 9 and 10. In the remaining, other lower branch of the bridge circuit there is disposed a further, adjustable resistance 11. The resistances 6, 7, 8 and 11 are selected in such a way that they compensate each other, so that when circuit voltage variations occur the voltage variation at the zener diodes 9 and 10 is compensated by the voltage at the resistance 11, which is opposed to the voltage at the zener diodes 9 and 10. The diagonally opposed output terminals of the bridge thus deliver a constant voltage. The bridge circuit is connected to a first current amplifier having a transistor 12 with an emitter-follower which operates as an impedance converter under the control of the voltage of the power source 49 for the motor M. The collector of transistor 12 is connected to a first main wire A of the circuit through a resistance 32. In the emitter circuit of the transistor 12 there is provided a multi-stage voltage divider between the series connected resistances of which 13 to 21, incl., tap contacts 22 to 29, incl., are provided. The lower end of resistance 21 is connected to a second main wire B of the circuit. Tap contacts 22 to 29, incl., are connected to a differential amplifier via a contact arm 31 which is rotatably mounted on a pivot axis 30. The center contact 31 is connected to the base of a transistor 34 via a resistance 33, the transistor 34 forming part of the differential amplifier.

A condenser 35 is connected between the base of transistor 34 and wire B, which as will be seen hereinafter, is connected to the negative terminal 55 of a direct current source, such as a rectified A.C. source 49. The condenser 35 smooths out the voltage variations caused by travel of arm 31 from one of contacts 22 to 29, incl., to another. The collector of transistor 34 is connected to wire A through a resistance 36 of low resistance value. Wire A is connected to the positive terminal 54 of the above-mentioned current source 49. The differential amplifier has a further transistor 37, the emitter of which is connected to the emitter of transistor 34; the junction between the two emitters is connected to wire B through a resistance 38. The collector of transistor 37 is connected to wire A through a resistance 39 of high resistance value. The base of transistor 37 is connected through two series connected NTC resistances 40, 41 to the upper terminal of the generator G. In parallel with both temperature-dependent resistances 40, 41 there are provided resistances 42 and 43, respectively. The base of the transistor 37 is also connected with a voltage divider resistance 44. There is provided a condenser 45 connected to wire B in the region of the generator G for smoothing out the generator voltage. The lower terminal of the generator is connected to the negative wire B.

The collector of the transistor 37 is connected with the base of the input transistor 46 of the additional current amplifier stage which is shown as of the cascade type having three transistors. The emitter of the transistor 46 is connected with the base of a further transistor 47, the emitter of which is connected to the base of an output transistor 48. The transistor 48 is preferably a high capacity power transistor. The collectors of the transistors 46, 47 and 48 are connected to the positive wire A. The collector and emitter of the output transistor 48 are connected in series with the upper terminal of the DC motor M. The second terminal of the motor is connected to the negative wire B. A voltage smoothing condenser 50 is provided between the negative wire B and the emitter of the output transistor 48. A voltage divider or potentiometer 51 is connected across the base-emitter of the transistor 48. The take-off leg 52 of the potentiometer is connected to the base of a transistor 53, which acts as a current limiter. The collector of the transistor 53 is connected to the collector of the transistor 37, which forms part of the differential amplifier, whereas the emitter of the transistor 53 is connected to the emitter of the output transistor 48.

The circuit arrangement of this invention operates as follows:

It is assumed that, in the illustrated position of the circular switch 31, the motor M operates at a stable, constant speed, and that the described compensating elements in the circuit are functioning to maintain such condition. The contact arm 31 and the contact point 24 of the voltage divider 13 – 21, incl., are connected with the base of transistor 34. As a result of this, the base of the transistor 34 is provided with a control voltage which adjusts the transistor 34 in such a way that the flow of collector current of the transistor 34 through the resistance 38 brings about a constant voltage drop. Because of such voltage drop, the emitter of the transistor 37 has a corresponding increase of its voltage value. It is assumed that the motor M is subjected to a constant load. The speed of rotation of the motor has accordingly been adjusted to a value corresponding to the adjusted control voltage. Voltage produced by the generator G causes a voltage drop at the resistance 44. The voltage differential between this voltage and the control voltage at the resistance 38 controls the transistor 37 in such a way that a current of a predetermined size flows through the collector resistance 39; such current flow causes a voltage drop in the resistance 39. The current which flows through the base of the transistor 46 is now amplified by means of the further connected transistors 47 and 48 to such a value that, by means of this current, the speed of rotation of the motor remains constant. If, for example, the motor is more strongly loaded, the motor will tend to rotate at a slower speed. As a result of this, the voltage furnished by the generator G and thus the voltage at the base of the transistor 37 is lowered by a corresponding amount. This causes a reduction of current flowing through the resistance 39, so that the base of the transistor 46 becomes more positive. The base current of the transistor 46 thus increases. This increased current is amplified by the further transistors 47, 48. The current flowing through the DC motor M is consequently increased by an amount which will immediately compensate the drop in the rotational velocity of the motor. As the load on the motor M increases, its speed of rotation is maintained constant by the described sensitive circuit arrangement. The same is true when the load of the motor decreases. If, for example, the contact arm 31 rotates to make contact with the contact 26, thereby to reduce the control voltage at the resistance 38 with respect to the previously adjusted control voltage value, the voltage between the base and emitter of the transistor 37 is increased by a corresponding amount. As a result of this, there is produced an increase of the current flowing through the resistance 39 and a consequent throttling of, or decrease in the current flow through, the transistors 46, 47 and 48. As a result of this, the current flowing through the motor M is decreased so that, with a given constant load of the motor M, its speed of rotation is increased. At the same time, the voltage drop at the resistance 44 of the generator G is also decreased. The current flowing through the resistance 39 is also reduced until the speed of rotation of the motor M reaches the value corresponding to that of the preselected control voltage.

If, for example, the motor M is held from rotation, the generator voltage sinks to zero, which causes the transistor 37 to be locked in non-conducting condition. Since, in this case, the base of the transistor 46 has the positive potential of the wire A, the transistors 46, 47 and 48 are in their maximum current-carrying condition. In order to protect the motor M against overload, the transistor 53 is now, to a very large degree, adjusted in accordance with the voltage drop at the voltage divider 51, so that a current flows via the resistance 39 and the collector-emitter path of the transistor 53. This causes the base of the transistor 46 to become more negative and, consequently, the transistors 46, 47 and 48 are adjusted or controlled to pass a smaller amount of current.

A thermal switch (not shown) may be provided to disconnect the motor M as well as the circuit arrangement generally from the voltage source upon a prolonged blocking of the motor. When, for example, the contact arm 31 is swung to the contact point 22, the voltage drop which occurs at the resistance 38 is raised vis a vis the control voltage provided when arm 31 engages contact 24. As a result of this, the transistor 37 is controlled so as to cause increased current flow through the motor M so that the motor speed increases. As a consequence, the voltage furnished by the generator G is also increased. The increased increase of the current demand by the motor M is terminated when the motor speed which corresponds to a selected control voltage has been reached.

If temperature variations should occur at the generator, the induction of the generator G is changed. It is assumed that a temperature increase causes a decrease of such induction. This will cause a decrease of the generator voltage, so that the compensating voltage at the base of the transistor 37 is also reduced. This causes an increase in the speed of the motor M. Since, however, with increasing temperature, the resistance 41 of the generator G is reduced. The voltage at the base of the transistor 37 is maintained constant. In other words, the reduction of the generator voltage is equalized by the decrease of the resistance. Consequently, the speed of the motor M remains constant despite temperature variations which may occur in the generator.

If temperature variations occur in the circuit arrangement generally, the electrical characteristics of the semi-conductor elements, for example, those of the transistors and zener diodes, are changed in such a way that a change in motor speed would occur because of variations at the zener diodes and transistors caused by the changes in temperature. The temperature-resistance 40, however, compensates for such changes. Resistance 40 is arranged in a circuit in the immediate vicinity of the zener diodes 9, 10 and the transistors 12, 34, 37, 46, 47 and 48. When the temperature increases, the resistance value of the resistance 40 is decreased in such a way that the increase of the speed of the motor, which would normally occur due to a temperature increase, in the absence of resistance 40 is compensated, in other words, motor speed remains constant.

It will be seen that the power source 49 for the motor M supplies the power for the control circuit arrangement; the voltage of such source, which is applied to the collector of transistor 12 through resistance 32, plays a significant role in the operation of the control circuit, since the collector-emitter current flow through transistor 12 varies with changes in the voltage of source 49. It is for this reason, among others pointed out above, that the circuit compensates for variations in the voltage of the motor supply source 49 so as to maintain the speed of the motor M substantially constant.

Although my invention has been illustrated and described with reference to one preferred embodiment thereof, I wish to have it understood that it is in no way limited to the details of this one embodiment but is capable of numerous modifications within the scope of the appended claims.

What is claimed is:

1. Apparatus for regulating the speed of a DC motor, which comprises:

means coupled to the motor for generating a first DC voltage normally proportional to the motor speed, said generating means being susceptible to temperature-dependent changes in the first DC voltage;

a differential amplifier having first and second inputs and an output, the amplifier being susceptible to temperature-induced changes in its operating point;

temperature-dependent resistive means interconnecting the output of the first DC voltage generating means and the first input of the differential amplifier, said resistive means being individually associated with the last-mentioned generating means and with the differential amplifier for respectively compensating both the temperature-induced changes in the first DC voltage and the temperature-induced changes in the operating point of the differential amplifier;

means responsive to the output of the differential amplifier for coupling to the motor a second DC voltage proportional to the output of the differential amplifier, the motor speed being normally proportional to the second DC voltage;

means for generating a stable motor speed control voltage comprising, in combination, an emitter follower having adjustable output resistance means, and means including a single resistance bridge circuit having an input connectable to a third DC voltage and an output coupled to the input of the emitter follower, the bridge circuit including a Zener diode in one arm and an adjustable resistance in another arm for compensating the finite resistance of the Zener diode, the output of the emitter follower constituting the output of the control voltage generating means; and means for coupling the output voltage of the control voltage generating means to the second input of the differential amplifier.

2. Apparatus as defined in claim 1, in which the adjustable output resistance means of the emitter follower comprises a plurality of serially connected resistors defining a corresponding number of output taps, and in which the output voltage coupling means comprises switching means for interconnecting a selected ones of the taps to the second input of the differential amplifier.

3. Apparatus as defined in claim 1, in which the temperature-dependent resistance means comprises, in combination, first and second serially connected temperature-dependent resistances, means for associating the first resistance with the generating means to expose the first resistance to temperature changes of the generating means, and means for associating the second resistance with the differential amplifier to expose the second resistance to temperature changes of the differential amplifier.

4. Apparatus as defined in claim 3, in which each of the first and second resistances has a negative temperature coefficient.

5. Apparatus as defined in claim 3, further comprising an additional pair of resistors individually shunting the first and second resistances.

6. Apparatus as defined in claim 1, in which the differential amplifier comprises, in combination, first and second transistors connected in common-emitter configuration, a common emitter resistor, a relatively high resistance in the collector circuit in the first transistor, and a relatively low resistance in the collector circuit of the second transistor, the bases of the first and second transistors individually constituting the first and second inputs of the differential amplifier and the collector of the first transistor constituting the output of the differential amplifier.

7. Apparatus as defined in claim 1, in which the second DC voltage coupling means comprises third, fourth and fifth transistors connected in cascade.

8. Apparatus as defined in claim 7, further comprising means coupled to the collector of the first transistor for reducing the second DC voltage when the motor is over-loaded.

9. Apparatus as defined in claim 7, in which the base of the third transistor is coupled to the output of the differential amplifier and in which the collector emitter-circuit of the fifth transistor is connected in series with the DC-motor.

10. In a speed control system for a DC motor wherein the system comprises, in combination, a differential amplifier having first and second inputs, means responsive to the output of the differential amplifier for coupling to the motor a first DC voltage proportional to the output voltage of the differential amplifier, means coupled to the motor for generating a second DC voltage proportional to the motor speed, means for generating a third DC voltage corresponding to a desired speed of the motor, means for coupling the second DC voltage to the first input of the differential amplifier, means for coupling the third DC voltage to the second input of the differential amplifier, and stabilizing means associated with the system for maintaining the speed of the motor relatively constant with changes in temperature, the improvement wherein:

the third DC voltage generating means comprises, in combination, an emitter follower having adjustable output resistance means, and means including a single resistance bridge circuit having an input connectable to a DC source and an output coupled to the input of the emitter follower, said bridge circuit including a Zener diode in one arm and an adjustable resistance in another arm for compensating the finite resistance of the Zener diode, the output of the emitter follower constituting the output of the third DC voltage generating means; and the stabilizing means comprises temperature-dependent resistive means interconnecting the output of the second DC voltage generating means and the first input of the differential amplifier, said resistive means being individually associated with the last-mentioned generating means and the differential amplifier for respectively compensating temperature-induced changes in the second DC voltage and temperature-induced changes in the operating point of the differential amplifier.

11. Apparatus for regulating the speed of a DC motor, which comprises:

means coupled to the motor for generating a first DC voltage normally proportional to the motor speed, said generating means being susceptible to temperature-dependent changes in the first DC voltage;

a differential amplifier having first and second inputs and an output, the amplifier being susceptible to temperature-induced changes in its operating point;

temperature-dependent resistive means interconnecting the output of the first DC voltage generating means and the first input of the differential amplifier, said resistive means being individually associated with the last-mentioned generating means and with the differential amplifier for respectively compensating both the temperature-induced changes in the first DC voltage and the temperature-induced changes in the operating point of the differential amplifier;

means responsive to the output of the differential amplifier for coupling to the motor a second DC voltage proportional to the output of the differential amplifier, the second DC voltage coupling means comprising first, second and third transistors connected in cascade;

a voltage divider having input terminals connected between the output and input of the third transistor;

means coupled to the output of the differential amplifier for reducing the second DC voltage when the motor is overloaded, the reducing means comprising a fourth transistor having a collector connected to the input of the first transistor, an emitter connected to the output of the third transistor and a base connected to the output of the voltage divider;

means for generating a stable motor speed control voltage comprising, in combination, an emitter follower having adjustable output resistance means, and means including a single resistance bridge circuit having an input connectable to a third DC voltage and an output coupled to the input of the emitter follower, the bridge circuit including a Zener diode in one arm and an adjustable resistance in another arm for compensating the finite resistance of the Zener diode, the output of the emitter follower constituting the output of the control voltage generating means; and means for coupling the output voltage of the control voltage generating means to the second input of the differential amplifier.

* * * * *